United States Patent [19]
Polidori

[11] Patent Number: 5,741,454
[45] Date of Patent: Apr. 21, 1998

[54] METHOD OF MAKING COMPOSITE TILES CONTAINING WASTE PLASTIC

[75] Inventor: Athos Polidori, Saludecio, Italy

[73] Assignee: Maloney Contractors Ltd., Dublin, Ireland

[21] Appl. No.: 290,857

[22] PCT Filed: Jul. 8, 1993

[86] PCT No.: PCT/IT93/00073

§ 371 Date: Aug. 12, 1994

§ 102(e) Date: Aug. 12, 1994

[87] PCT Pub. No.: WO94/01266

PCT Pub. Date: Jan. 20, 1994

[30] Foreign Application Priority Data

Jul. 13, 1992 [IL] Israel ................. BO92A0275

[51] Int. Cl.⁶ ................................ B29C 45/13
[52] U.S. Cl. .............. 264/45.1; 264/45.7; 264/112; 264/122; 264/250; 264/310; 264/271.1; 264/279.1; 264/378.16; 264/378.17; 428/99; 428/904.4
[58] Field of Search .................. 428/99, 44, 45, 428/47, 48, 51, 52, 80, 131, 134, 137, 192, 212, 904.4; 264/45.1, 45.7, 122, 112, 250, 310, 271.1, 279.1, 378.17, 378.16

[56] References Cited

U.S. PATENT DOCUMENTS

| | | | |
|---|---|---|---|
| 3,328,499 | 6/1967 | Barnette | 428/15 |
| 3,457,133 | 7/1969 | Barnette | 428/15 |
| 3,519,525 | 7/1970 | Jackstadt | 428/48 |
| 3,800,016 | 3/1974 | Roberts | 264/45 |
| 4,401,050 | 8/1983 | Britt et al. | 116/205 |
| 4,795,603 | 1/1989 | Nagayasu | 264/328.18 |
| 4,942,072 | 7/1990 | Chung | 428/48 |
| 5,075,057 | 12/1991 | Hoedl | 264/115 |
| 5,514,310 | 5/1996 | Sander | 264/37 |

FOREIGN PATENT DOCUMENTS

| | | |
|---|---|---|
| 0340598 | 11/1989 | European Pat. Off. . |
| 3827852 | 3/1989 | Germany . |
| 1330281 | 9/1973 | United Kingdom . |
| 2134944 | 8/1984 | United Kingdom . |
| 2157470 | 10/1985 | United Kingdom . |
| 8907219 | 8/1989 | WIPO . |

*Primary Examiner*—Nasser Ahmad
*Attorney, Agent, or Firm*—Darby & Darby

[57] ABSTRACT

The present invention concerns a manufacturing process and a related product constituted of a tile in plastic material. The process comprises the following operative stages: crushing a thermoplastic material of recovery, injecting quality plastic material into a mold with a primary punch and a matrix associated to enable the formation of the first layer of the tile between them, rotating the mold to reverse the reciprocal position of the matrix and the primary punch, replacing the primary punch with a secondary punch to mark out, in its association with the matrix, between the first layer, supported by the matrix and the secondary punch, a cavity to contain the thermoplastic material of recovery, injecting the thermoplastic material of recovery into the cavity with the formation of a second layer of a plastic material arranged inside the tile.

7 Claims, 2 Drawing Sheets

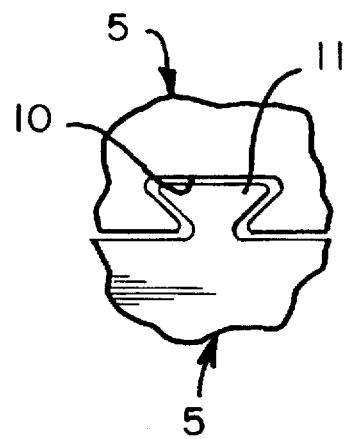
FIG. 3A
FIG. 4
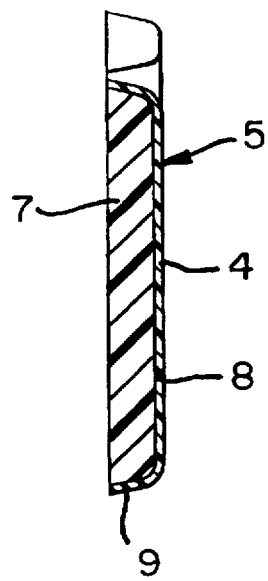
FIG. 5
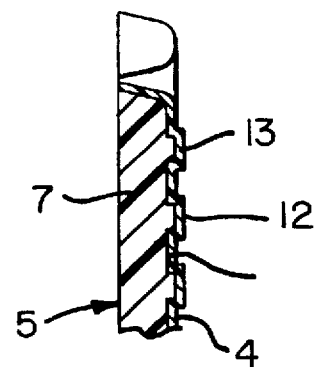

METHOD OF MAKING COMPOSITE TILES CONTAINING WASTE PLASTIC

BACKGROUND OF THE INVENTION

This present invention concerns a manufacturing process and a composite tile of plastic material obtained by said process.

The plastic materials composed of the waste of some industrial processes (for example in the shoe-making sector), and/or coming from plastic objects of current use being put out of use, are frequently crushed to be used again in subsequent transformations.

The latter recovery operation, however, is not always cost-effective and possible as the crushed material in some cases assumes such poor properties that it is not possible to use it again not even in the manufacture of low quality products.

As a consequence of this it is known that much plastic waste is accumulated in landfills, causing considerable storage problems as it cannot be burned due to the environmental pollution that would ensue from its combustion process.

The purpose of this present invention, as characterised by its claims, is therefore to eliminate the above mentioned drawbacks.

BRIEF DESCRIPTION OF THE INVENTION

The invention solves the problem of making, by means of a suitable manufacturing process, a composite tile in which plastic material of a suitable quality for the environment in which the tile will be used is injected into a mould so as to form an outer shell of the tile, inside which, at a later stage, waste plastic material is injected with the function of filling the tile.

The fundamental advantage obtained by this present invention lies in the fact that waste plastic materials, not directly reusable, are cost-effectively re-used with a considerable reduction in the problems of environmental hazards caused by their accumulation in landfills.

Moreover the amount of plastic material of greater value, forming the outer layer of the tile, can be reduced to a minimum thereby contributing to reduce the ever growing demand for plastic materials of the first transformation with the benefit of containing energy consumption and primary resources that are normally used for the manufacture of plastic materials.

Additional advantages and characteristcs of the process and of the product in accordance with the invention will be highlighted in the following detailed description and with the aid of drawings given purely by way of example and not as a limit, in which:

BRIEF DESCRIPTION OF THE DRAWINGS

FIG. 3A shows a detail af a variant made on the tile of FIG. 3;

FIG. 4 illustrates a cross-section, made along the section line IV—IV, of the tile of FIG. 3;

FIG. 5 shows a detail of a possible variant made on the tile of FIG. 3.

DETAILED DESCRIPTION OF THE INVENTION

Figure 1:
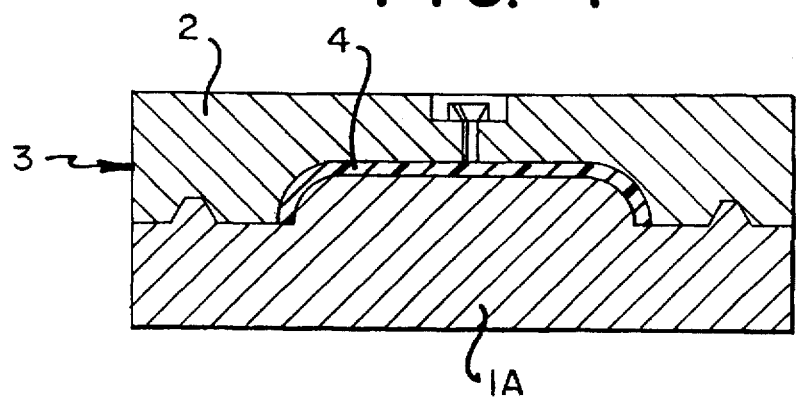
FIGS. 1 and 2 illustrate two operative stages of the manufacturing process for said tiles.

With reference to the figures notice that the invention essentially consists of a manufacturing process of a composite tile (5) (FIGS. 3.4) made of plastic material provided with one outer layer (4) made of quality first transformation plastic material, i.e., virgin material, with suitable properties for its use, arranged so as to surround a second layer (7) of plastic material, preferably waste plastic, formed on the inside. The side (8) and on the outer edges (9) hide the second layer (7), inside the body of the tile (5).

Figure 2:
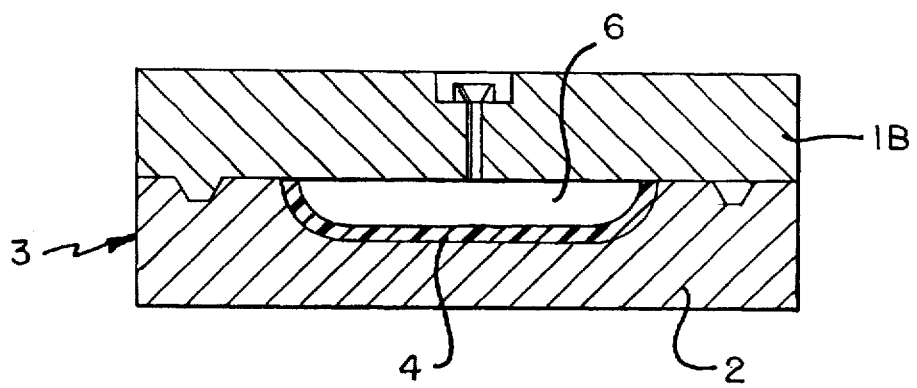

The process comprised the following operative stages:

crushing waste thermoplastic material;

injecting quality (virgin) plastic material (FIG. 1) into a mould (3) with a primary punch (1A) and a matrix (2) associated to enable the formation of the first layer (4) of the tile (5) between them;

rotating (FIG. 2) the mould (3) to reverse the reciprocal position of the matrix (2) and of the primary punch (1A);

replacing the primary punch (1A) with a secondary punch (1B) to mark out, in its association with the matrix (2), between the first layer (4), supported by the matrix (2) and the secondary punch (1B), a cavity (6) to contain the waste thermoplastic material;

injecting waste thermoplastic material into the cavity (6) with the formation of a second layer (7) of plastic material arranged inside the tile (5).

The plastic material forming the first layer (4), formed on the outside, of the tile (5) is made so as to have features suited to the environment where the tile (5) has to be used.

For this purpose, for instance, it may be made of non-toxic and washable material if it is necessary to have a hygienic screen allowing the tile (5) to be used to clad walls or cover floors of dwelling places.

This material could, moreover, be fluorescent if wishing to use the tile (5) to make low-cost pathways with facilitated visibility in conditions of poor lighting.

Figure 3:
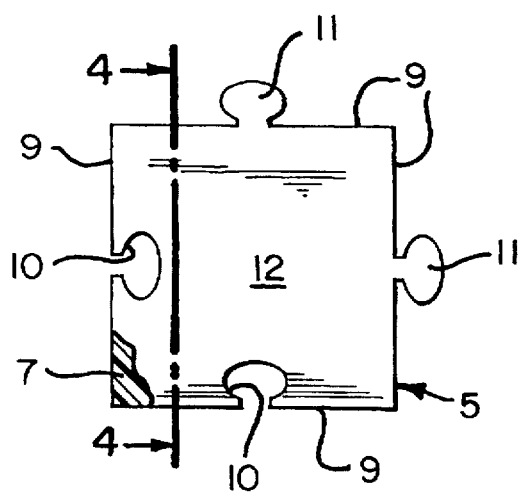
FIG. 3 illustrates one form of making the tiles according to the invention.

With reference to FIG. 3 it should, moreover, be pointed out that the tile has outer edges (9) provided with shaped cavities (10) and with protruding elements (11) shaped complementarily with the cavities (10) so they will combine geometrically to enable the joining of one tile (5) with coplanar adjacent tiles.

This is to make it possible to have self-stabilising wall coverings which, at the same time, can easily be removed and floor coverings without the need to use adhesives.

Preferentially, as shown in FIG. 3, the cavities (10) and the protruding elements (11) of the outer edges (9) have an elliptic shape.

However, numerous geometric variants are possible to enable making a joint between adjacent tiles (5).

One possible variant is shown in FIG. 3A where the cavities (10) and the protruding elements (11) have a dovetail complementary shape.

An additional alternative feature of the tiles (5) in accordance with the invention (FIG. 5) is represented by the fact that the first layer (4) has one face (12) with protuberances (13) on it in order to make non-slip pedestrian pathways in swimming pools and/or also pathways enabling foot massage when walking barefoot.

The invention thus conceived may be subject to many modifications and variants, all within the framework of the concept of the invention.

Furthermore, all the details may be replaced by technically equivalent elements.

In practice, modifications and/or improvements are obviously possible though anyhow they fall within the framework of the following claims.

I claim:

1. A process for manufacturing a composite tile from waste thermoplastic material comprising the steps of:

(a) crushing the waste thermoplastic material;

(b) injecting a virgin plastic material into a mold between a cavity formed by a primary punch and a matrix associated with said mold to form the first layer of said tile;

(c) rotating said mold after said injecting step to reverse the position of said matrix and of said primary punch;

(d) replacing said primary punch with a secondary punch to form a cavity between said first layer, supported by said matrix and said secondary punch; and (e) injecting said waste thermoplastic material into said cavity to form a second layer of plastic material arranged upon said first layer of said tile.

2. The process of claim 1, wherein said first layer surrounds said second layer on one face and on at least one outer edge so as to hide said second layer.

3. The process of claim 2, wherein said outer edge has at least one shaped cavity and at least one protruding element shaped as a complement to said cavity so that said cavity and said protruding element will combine geometrically and enable the joint of said tile to join with at least one coplanar adjacent tile.

4. The process of claim 2, wherein said first layer has one face provided with protuberances.

5. The process of claim 2, wherein said virgin plastic material of said first layer includes a fluorescent substance.

6. The process of claim 3, wherein said protruding element and said cavity have an elliptical shape.

7. The process of claim 3, wherein said protruding element and said cavity have a dovetail shape.

* * * * *

UNITED STATES PATENT AND TRADEMARK OFFICE
CERTIFICATE OF CORRECTION

PATENT NO. : 5,741,454
DATED : April 21, 1998
INVENTOR(S) : Athos POLIDORI

It is certified that error appears in the above-identified patent and that said Letters Patent is hereby corrected as shown below:

Cover page: Item [30], Foreign Application Priority Data, change
"Jul. 13, 1992   [IL]   Israel . . . . . . BO92A0275"
to
--Jul. 13, 1992   [IT]   Italy . . . . . . BO92A0275 --.

Signed and Sealed this

First Day of September, 1998

Attest:

BRUCE LEHMAN

Attesting Officer        Commissioner of Patents and Trademarks